(12) United States Patent
Sato et al.

(10) Patent No.: US 11,377,149 B2
(45) Date of Patent: Jul. 5, 2022

(54) VEHICLE CONTROL SYSTEM

(71) Applicant: TOYOTA JIDOSHA KABUSHIKI KAISHA, Toyota (JP)

(72) Inventors: Masaya Sato, Okazaki (JP); Yoji Kunihiro, Susono (JP); Yoshinori Watanabe, Isehara (JP); Shunsuke Tanimori, Susono (JP); Hisaya Akatsuka, Susono (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 87 days.

(21) Appl. No.: 16/725,068

(22) Filed: Dec. 23, 2019

(65) Prior Publication Data

US 2020/0262478 A1    Aug. 20, 2020

(30) Foreign Application Priority Data

Feb. 14, 2019 (JP) .............................. JP2019-024544

(51) Int. Cl.
*B62D 15/02* (2006.01)
*B60W 50/10* (2012.01)
*B62D 6/10* (2006.01)

(52) U.S. Cl.
CPC ........... *B62D 15/026* (2013.01); *B60W 50/10* (2013.01); *B62D 6/10* (2013.01); *B62D 15/021* (2013.01);
(Continued)

(58) Field of Classification Search
CPC ...... B62D 15/00; B62D 15/02; B62D 15/021; B62D 15/025; B62D 15/026; B62D 6/00;
(Continued)

(56) References Cited

U.S. PATENT DOCUMENTS

2015/0191199 A1* 7/2015 Tsubaki ............... B62D 15/025
 701/42
2015/0344066 A1* 12/2015 Tsubaki .................. B62D 6/08
 701/41
(Continued)

FOREIGN PATENT DOCUMENTS

CN         104684792 A      6/2015
JP         11-198839 A      7/1999
(Continued)

*Primary Examiner* — Geepy Pe
*Assistant Examiner* — Michael Allen Brace, Jr.
(74) *Attorney, Agent, or Firm* — Sughrue Mion, PLLC

(57) ABSTRACT

A vehicle control system includes: a turning device that turns a wheel of a vehicle; a steering sensor that detects a driver's steering operation; and a control device configured to execute automated turning control that controls the turning device to automatically turn the wheel, independently of the driver's steering operation. A modification desire degree represents a degree to which the driver's steering operation modifies vehicle travel caused by the automated turning control. During execution of the automated turning control, the control device calculates the modification desire degree based on a result of detection by the steering sensor. When the modification desire degree exceeds a threshold, the control device executes system suppression processing without terminating the automated turning control. In the system suppression processing, the control device weakens the automated turning control as compared to a case where the modification desire degree is equal to or lower than the threshold.

8 Claims, 14 Drawing Sheets

(52) U.S. Cl.
CPC ... *B60W 2510/202* (2013.01); *B60W 2540/18* (2013.01)

(58) Field of Classification Search
CPC .......... B62D 6/08; B62D 6/10; B60W 50/00; B60W 50/08; B60W 50/10; B60W 2510/00; B60W 2510/20; B60W 2510/202; B60W 2540/00; B60W 2540/18
See application file for complete search history.

(56) References Cited

U.S. PATENT DOCUMENTS

| | | |
|---|---|---|
| 2016/0207536 A1 | 7/2016 | Yamaoka et al. |
| 2018/0015947 A1* | 1/2018 | Akatsuka .............. B62D 5/0463 |
| 2019/0193782 A1* | 6/2019 | Tsubaki ................. B62D 1/286 |
| 2019/0276077 A1* | 9/2019 | Itou ....................... B60W 10/20 |

FOREIGN PATENT DOCUMENTS

| | | |
|---|---|---|
| JP | 2002-117495 A | 4/2002 |
| JP | 2014-024448 A | 2/2014 |
| JP | 2015-33942 A | 2/2015 |
| JP | 2016-132351 A | 7/2016 |

* cited by examiner

VEHICLE CONTROL SYSTEM

BACKGROUND

Technical Field

The present disclosure relates to a vehicle control system installed on a vehicle. In particular, the present disclosure relates to a vehicle control system that executes automated turning control.

Background Art

Patent Literature 1 discloses a steering assist device of a vehicle. The steering assist device performs steering assist for a driver by applying a steering torque to a steering system such that the vehicle travels along a lane.

LIST OF RELATED ART

Patent Literature 1: Japanese Laid-Open Patent Application Publication No. JP-2014-024448

SUMMARY

Let us consider "automated turning control" that automatically turns (i.e. changes a direction of) a wheel of a vehicle. Vehicle travel caused by the automated turning control does not necessarily match driver's feeling (intention, preference). Therefore, during execution of the automated turning control, the driver may perform a steering operation (i.e. an operation of a steering wheel) to modify a position and behavior of the vehicle. Such the modification by the driver is disturbance for the automated turning control. Therefore, the automated turning control operates so as to cancel the disturbance, that is, to counteract the steering operation performed by the driver. This causes unsteady motion of the vehicle. In addition, the vehicle does not travel as desired by the driver. As a result, the driver feels senses of strangeness and annoyance.

An object of the present disclosure is to provide a technique that can reduce the driver's senses of strangeness and annoyance during execution of the automated turning control.

A first aspect is directed to a vehicle control system that controls a vehicle.

The vehicle control system includes:

a turning device configured to turn a wheel of the vehicle;

a steering sensor configured to detect a steering operation performed by a driver of the vehicle; and a control device configured to execute automated turning control that controls the turning device to automatically turn the wheel, independently of the steering operation.

A modification desire degree represents a degree to which the steering operation performed by the driver modifies vehicle travel caused by the automated turning control.

During execution of the automated turning control, the control device calculates the modification desire degree based on a result of detection by the steering sensor.

When the modification desire degree exceeds a threshold, the control device executes system suppression processing without terminating the automated turning control.

In the system suppression processing, the control device weakens the automated turning control as compared to a case where the modification desire degree is equal to or lower than the threshold.

A second aspect further has the following feature in addition to the first aspect.

A degree to which the automated turning control weakens increases as the modification desire degree increases from the threshold.

A third aspect further has the following feature in addition to the first or second aspect.

In the system suppression processing, the control device decreases a control gain used for calculating a control amount of the automated turning control as compared to the case where the modification desire degree is equal to or lower than the threshold.

A fourth aspect further has the following feature in addition to the third aspect.

The automated turning control includes trajectory-following control that controls turning of the wheel such that the vehicle follows a target trajectory.

In the trajectory-following control, the control device calculates a target turn angle based on a deviation between the vehicle and the target trajectory and executes feedback control such that an actual turn angle follows the target turn angle.

The control gain decreased in the system suppression processing includes at least one of a first gain used for calculating the target turn angle from the deviation and a second gain of the feedback control.

A fifth aspect further has the following feature in addition to any one of the first to fourth aspects.

The steering sensor detects a steering torque caused by the steering operation.

The control device calculates the modification desire degree based on a fluctuation range of the steering torque.

A sixth aspect further has the following feature in addition to the fifth aspect.

The modification desire degree is the fluctuation range of the steering torque.

A seventh aspect further has the following feature in addition to the fifth aspect.

The modification desire degree is duration or an occurrence frequency of a state where the fluctuation range of the steering torque exceeds a fluctuation range threshold.

An eighth aspect further has the following feature in addition to the fifth aspect.

The modification desire degree is an integral value of the fluctuation range of the steering torque in a first period.

A ninth aspect further has the following feature in addition to the eighth aspect.

The control device variably sets the first period according to the fluctuation range of the steering torque.

The first period is shorter as the fluctuation range of the steering torque is larger.

A tenth aspect is directed to a vehicle control system that controls a vehicle.

The vehicle control system includes:

a turning device configured to turn a wheel of the vehicle;

a steering sensor configured to detect a steering operation performed by a driver of the vehicle; and a control device.

The control device is configured to:

execute assist control that controls the turning device to assist turning of the wheel according to the steering operation performed by the driver; and execute automated turning control that controls the turning device to automatically turn the wheel, independently of the steering operation.

A modification desire degree represents a degree to which the steering operation performed by the driver modifies vehicle travel caused by the automated turning control.

During execution of the automated turning control, the control device calculates the modification desire degree based on a result of detection by the steering sensor.

When the modification desire degree exceeds a threshold, the control device executes system suppression processing without terminating the automated turning control.

In the system suppression processing, the control device weakens the automated turning control or strengthens the assist control as compared to a case where the modification desire degree is equal to or lower than the threshold.

The vehicle control system according to the present disclosure executes the system suppression processing when the modification desire degree exceeds the threshold during execution of the automated turning control. In the system suppression processing, the vehicle control system weakens the automated turning control as compared to the case where the modification desire degree is equal to or lower than the threshold. As a result, the driver's senses of strangeness and annoyance during execution of the automated turning control are reduced.

Moreover, the vehicle control system calculates the modification desire degree that represents a degree to which the steering operation performed by the driver modifies vehicle travel caused by the automated turning control. Then, the vehicle control system determines whether to execute the system suppression processing based on the calculated modification desire degree. The driver's feeling varies from driver to driver. In addition, even for a same driver, the driver's desire can vary depending on a situation. That is, the driver's desire can vary in drivers and depending on a situation. Not merely detecting the driver's steering operation but also specifically calculating and referring to the modification desire degree makes it possible to appropriately grasp the driver's desire.

EMBODIMENTS

Embodiments of the present disclosure will be described below with reference to the attached drawings.

1. First Embodiment 1-1. Outline

Figure 1:
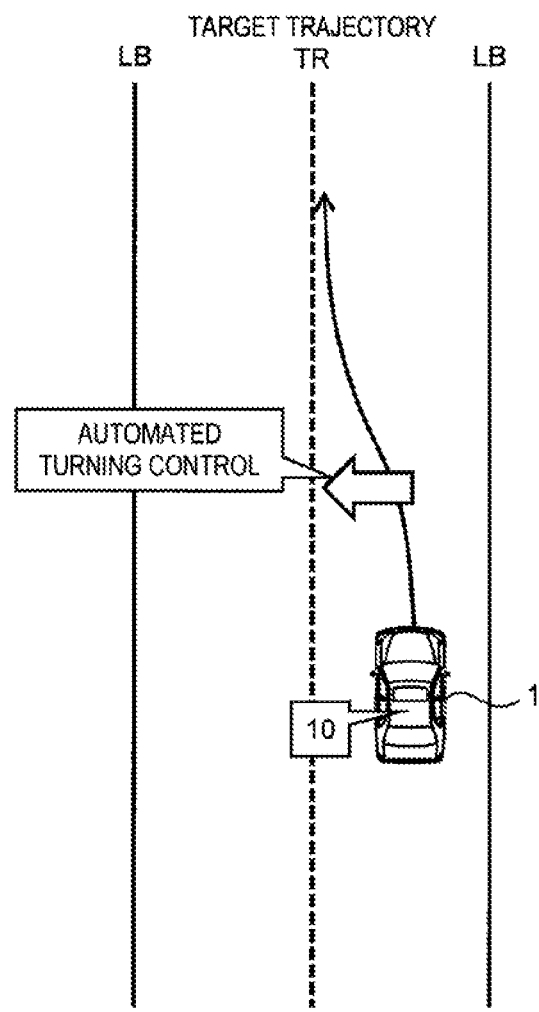
FIG. 1 is a conceptual diagram for explaining an outline of a vehicle control system according to a first embodiment of the present disclosure.

FIG. 1 is a conceptual diagram for explaining an outline of a vehicle control system 10 according to a first embodiment. The vehicle control system 10 is installed on a vehicle 1 and controls the vehicle 1. In particular, the vehicle control system 10 at least executes "automated turning control" that automatically turns (i.e. changes a direction of) a wheel of the vehicle 1.

An example of the automated turning control is trajectory-following control. The vehicle control system 10 determines a target trajectory TR and controls travel (at least one of turning, acceleration, and deceleration) of the vehicle 1 such that the vehicle 1 follows the target trajectory TR. Such the trajectory-following control is executed in automated driving control, lane tracing assist (LTA), and the like.

Another example of the automated turning control is lane departure prevention control that prevents the vehicle 1 from departing from a travel lane. For example, when the vehicle 1 comes close to a lane boundary LB, the vehicle control system 10 executes the automated turning control to return the vehicle 1 to the center of the travel lane.

Figure 2:
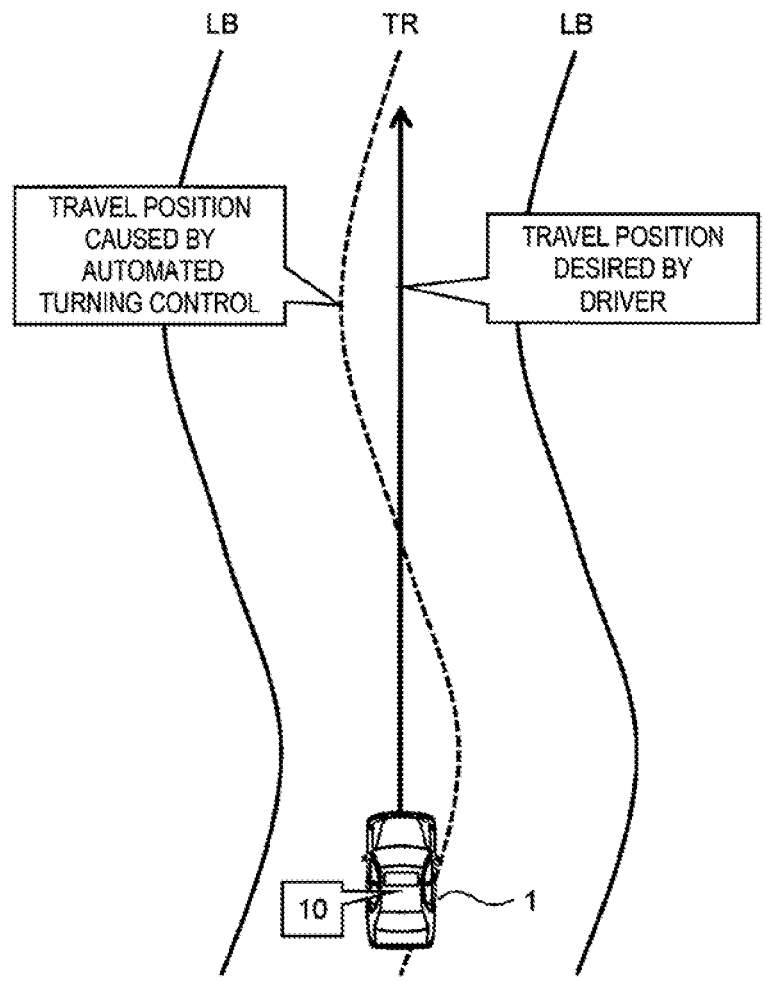
FIG. 2 is a conceptual diagram showing an example of a situation where a steering operation performed by a driver modifies vehicle travel caused by automated turning control.
Figure 3:
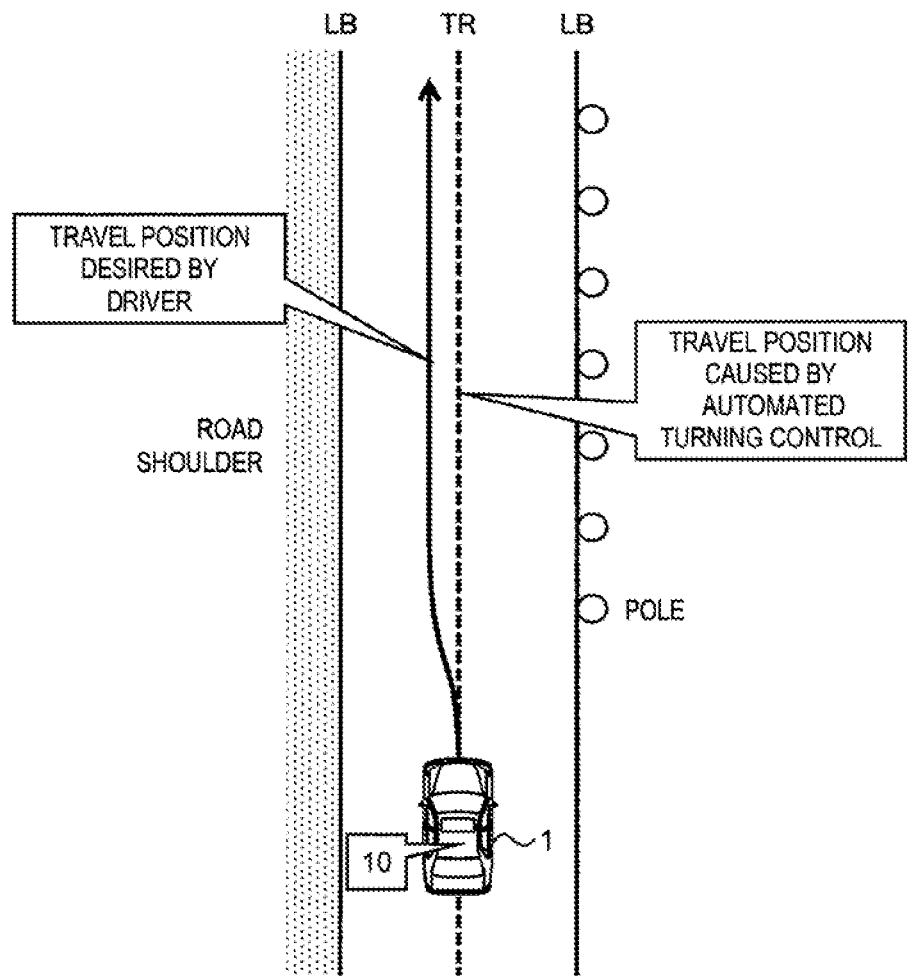
FIG. 3 is a conceptual diagram showing another example of the situation where the steering operation performed by the driver modifies vehicle travel caused by the automated turning control.

It should be noted here that the vehicle travel caused by the automated turning control does not necessarily match a feeling (intention, preference) of a driver of the vehicle 1. Therefore, during execution of the automated turning control, the driver may perform a steering operation (i.e. an operation of a steering wheel) to modify a position and behavior of the vehicle 1. That is, in some cases, the steering operation performed by the driver modifies the vehicle travel caused by the automated turning control. FIGS. 2 and 3 exemplify such cases.

In an example shown in FIG. 2, the vehicle control system 10 executes the trajectory-following control described above. In this example, the target trajectory TR is located at the center of the travel lane. However, a travel position desired by the driver in a curve zone is not necessarily at the center of the travel lane. Therefore, the driver may perform the steering operation to modify the vehicle travel caused by the trajectory-following control (i.e. the automated turning control).

Also in an example shown in FIG. 3, the target trajectory TR is located at the center of the travel lane. However, when there are poles on one side of the travel lane, the driver desires to travel with keeping a certain distance from the poles. Therefore, the driver may perform the steering operation to modify the vehicle travel caused by the trajectory-following control (i.e. the automated turning control).

The modification by the driver is disturbance for the automated turning control. Therefore, the automated turning control operates so as to cancel the disturbance, that is, to counteract the steering operation performed by the driver. This causes unsteady motion of the vehicle 1. In addition, the vehicle 1 does not travel as desired by the driver. As a result, the driver feels senses of strangeness and annoyance. In view of the above, the present embodiment provides a technique that can reduce the driver's senses of strangeness and annoyance during execution of the automated turning control.

Figure 4:
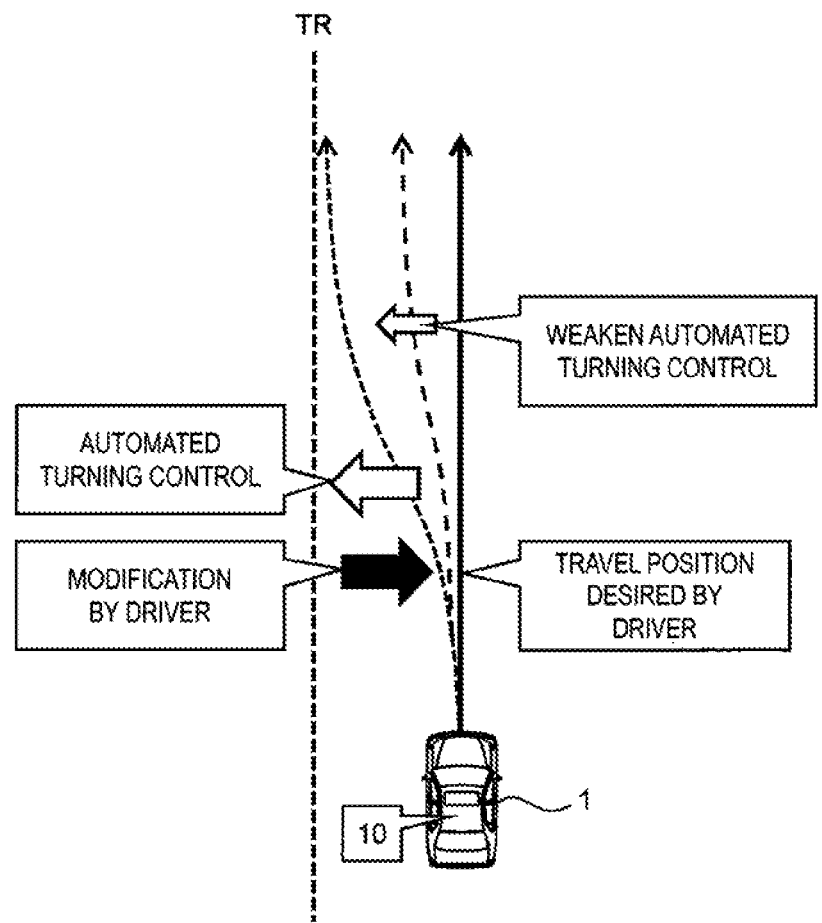
FIG. 4 is a conceptual diagram for explaining system suppression processing executed by the vehicle control system according to the first embodiment of the present disclosure.

FIG. 4 is a conceptual diagram for explaining a feature of the present embodiment. As described above, during execution of the automated turning control, the steering operation performed by the driver may modify the vehicle travel caused by the automated turning control. A degree to which the steering operation performed by the driver modifies the vehicle travel caused by the automated turning control is hereinafter referred to as a "modification desire degree R". It can be said that the modification desire degree R is a concept opposite to a degree of confidence in the automated turning control.

During execution of the automated turning control, the vehicle control system 10 calculates the modification desire degree R. When the modification desire degree R is high, it is presumed that the driver is feeling senses of strangeness and annoyance with respect to the vehicle travel caused by the automated turning control. In that case, the vehicle control system 10 weakens the automated turning control. More specifically, when modification desire degree R exceeds a threshold Rth, the vehicle control system 10 weakens the automated turning control as compared to a case where the modification desire degree R is equal to or lower than the threshold Rth. Here, "weakening the automated turning control" means decreasing influence (contribution) of the automated turning control on the turning of the wheel. Such the processing of weakening the automated turning control is hereinafter referred to as "system suppression processing".

It should be noted that even when the system suppression processing is executed, the automated turning control continues without being terminated. That is, the vehicle control system 10 weakens the automated turning control without terminating the automated turning control. For example, the vehicle control system 10 continues the trajectory-following control with keeping the target trajectory TR.

As described above, the vehicle control system 10 according to the present embodiment executes the system suppression processing when the modification desire degree R exceeds the threshold Rth during execution of the automated turning control. In the system suppression processing, the vehicle control system 10 weakens the automated turning control as compared to the case where the modification desire degree R is equal to or lower than the threshold Rth. As a result, the driver's senses of strangeness and annoyance during execution of the automated turning control are reduced.

Moreover, according to the present embodiment, the vehicle control system 10 calculates the modification desire degree R that represents a degree to which the steering operation performed by the driver modifies the vehicle travel caused by the automated turning control. Then, the vehicle control system 10 determines whether to execute the system suppression processing based on the calculated modification desire degree R. The driver's feeling varies from driver to driver. In addition, even for a same driver, the driver's desire can vary depending on a situation. That is, the driver's desire can vary in drivers and depending on a situation. Not merely detecting the driver's steering operation but also specifically calculating and referring to the modification desire degree R makes it possible to appropriately grasp the driver's desire.

A degree to which the automated turning control weakens may increase monotonically or in a stepwise fashion as the modification desire degree R increases from the threshold Rth. This makes it possible to further effectively reduce the driver's senses of strangeness and annoyance.

1-2. Configuration Example

Figure 5:
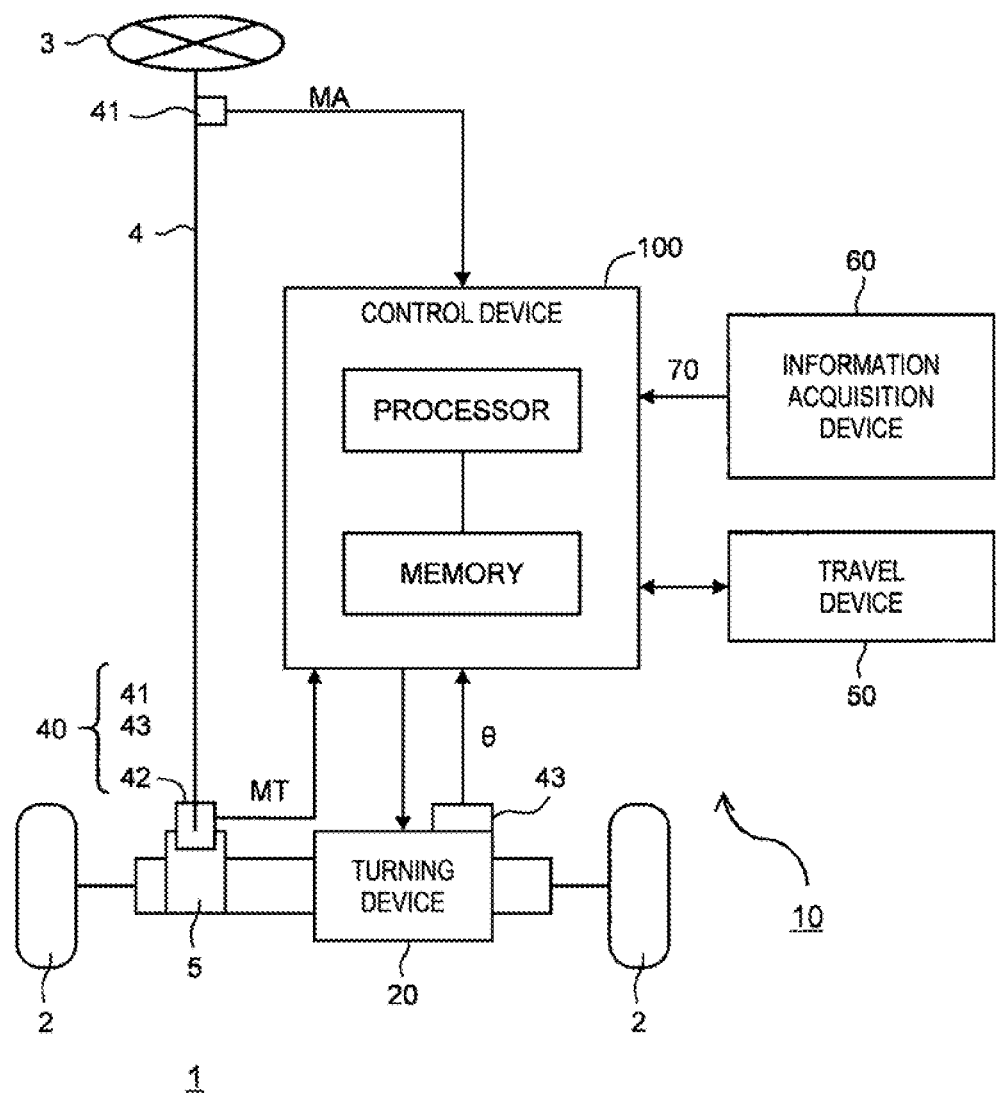
FIG. 5 is a block diagram showing a concrete configuration example of a vehicle and the vehicle control system according to the first embodiment of the present disclosure.

FIG. 5 is a block diagram showing a concrete configuration example of the vehicle 1 and the vehicle control system 10 according to the first embodiment.

The vehicle 1 is provided with wheels 2, a steering wheel 3, a steering shaft 4, and a turning mechanism 5. The steering wheel 3 is an operation member used by the driver for performing the steering operation. One end of the steering shaft 4 is coupled to the steering wheel 3, and the other end thereof is coupled to the turning mechanism 5. The turning mechanism 5 turns (i.e. changes a direction of) the wheel 2 in accordance with a rotating operation of the steering wheel 3. More specifically, the turning mechanism 5 includes a pinion gear coupled to the steering shaft 4, a rack bar engaging with the pinion gear, and a tie rod connecting between the rack bar and the wheel 2. A rotation of the steering wheel 3 is transmitted to the pinion gear through the steering shaft 4. A rotational motion of the pinion gear is converted into a linear motion of the rack bar, and thereby a turn angle $\theta$ of the wheel 2 changes.

The vehicle control system 10 includes a turning device 20, a steering sensor 40, a travel device 50, an information acquisition device 60, and a control device (controller) 100.

The turning device 20 includes a turning motor (a turning actuator) and turns (i.e. changes a direction of) the wheel 2 by actuating the turning motor. For example, the turning motor is coupled to the rack bar through a conversion mechanism. When a rotor of the turning motor rotates, the conversion mechanism converts the rotational motion into a linear motion of the rack bar, and thereby the turn angle $\theta$ of the wheel 2 changes. The turning device 20 is also called an EPS (Electric Power Steering). An operation of the turning device 20 is controlled by the control device 100.

The steering sensor 40 detects the steering operation (i.e. the operation of the steering wheel 3) performed by the driver of the vehicle 1. The steering sensor 40 includes a steering wheel angle sensor 41, a steering torque sensor 42, and a turn angle sensor 43.

The steering wheel angle sensor 41 detects a steering wheel angle MA being a steering angle of the steering wheel 3. The steering wheel angle sensor 41 outputs information indicating the steering wheel angle MA to the control device 100.

The steering torque sensor 42 detects a steering torque MT applied to the steering shaft 4. The steering torque sensor 42 outputs information indicating the steering torque MT to the control device 100.

The turn angle sensor 43 detects the turn angle θ of the wheel 2. For example, the turn angle sensor 43 calculates the turn angle θ from a rotation angle of the turning motor of the turning device 20. The turn angle sensor 43 outputs information indicating the turn angle θ to the control device 100.

The travel device 50 includes a driving device and a braking device. The driving device is a power source that generates a driving force. The driving device is exemplified by an engine and an electric motor. The braking device generates a braking force. An operation of the travel device 50 is controlled by the control device 100.

The information acquisition device 60 acquires information necessary for vehicle travel control executed by the vehicle control system 10. The information necessary for the vehicle travel control is information indicating driving environment for the vehicle 1, and is hereinafter referred to as "driving environment information 70". The information acquisition device 60 transmits the acquired driving environment information 70 to the control device 100.

Figure 6:
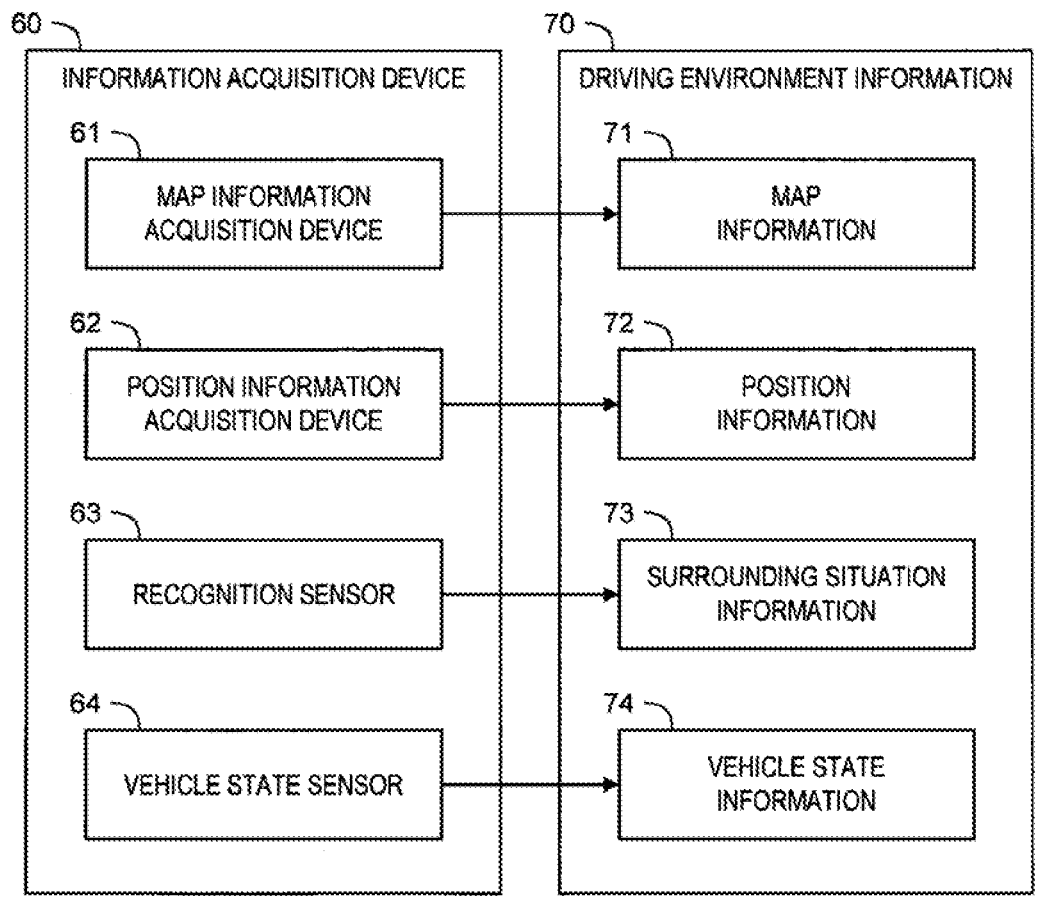
FIG. 6 is a block diagram showing an example of an information acquisition device and driving environment information according to the first embodiment of the present disclosure.

FIG. 6 is a block diagram showing an example of the information acquisition device 60 and the driving environment information 70. The information acquisition device 60 includes a map information acquisition device 61, a position information acquisition device 62, a recognition sensor 63, and a vehicle state sensor 64. The driving environment information 70 includes map information 71, position information 72, surrounding situation information 73, and vehicle state information 74.

The map information acquisition device 61 acquires the map information 71 that indicates a lane configuration, a road shape, and the like. For example, the map information acquisition device 61 acquires the map information 71 of a required area from a map database. The map database may be stored in a predetermined memory device mounted on the vehicle 1, or may be stored in a management server outside the vehicle 1. In the latter case, the map information acquisition device 61 acquires the necessary map information 71 from the map database of the management server through communication.

The position information acquisition device 62 acquires the position information 72 that indicates a position and an orientation (azimuth) of the vehicle 1. For example, the position information acquisition device 62 includes a GPS (Global Positioning System) device that measures the position and the orientation of the vehicle 1. The position information acquisition device 62 may further include a sensor that detects white lines around the vehicle 1. Matching a configuration of the detected white lines and the lane configuration indicated by the map information 71 makes it possible to calculate the position and the orientation of the vehicle 1 with a higher degree of accuracy.

The recognition sensor 63 recognizes (detects) a situation around the vehicle 1. For example, the recognition sensor 63 includes a camera, a LIDAR (Laser Imaging Detection and Ranging), and a radar. The surrounding situation information 73 indicates a result of recognition by the recognition sensor 63. For example, the surrounding situation information 73 includes information on white lines and surrounding vehicles around the vehicle 1.

The vehicle state sensor 64 acquires the vehicle state information 74 that indicates a state of the vehicle 1. For example, the vehicle state sensor 64 includes a vehicle speed sensor, a wheel speed sensor, a yaw rate sensor, an acceleration sensor, the above-mentioned steering sensor 40, and so forth. The vehicle speed sensor detects a vehicle speed V (i.e. a speed of the vehicle 1). The wheel speed sensor detects a wheel speed of each wheel. The yaw rate sensor detects a yaw rate YR of the vehicle 1. The acceleration sensor detects accelerations of the vehicle 1.

The control device (controller) 100 is a microcomputer including a processor and a memory. The control device 100 is also called an ECU (Electronic Control Unit). A variety of processing by the control device 100 is achieved by the processor executing a control program stored in the memory. For example, the control device 100 controls the turning device 20 to control the turning of the wheel 2. In addition, the control device 100 controls the travel device 50 to control acceleration and deceleration. Hereinafter, turning control executed by the control device 100 will be described in detail.

1-3. Basic Turning Control

The turning control executed by the control device 100 includes "driver-driven turning control" and the above-described "automated turning control". The driver-driven turning control is the turning control that is executed according to the steering operation performed by the driver. On the other hand, the automated turning control is the turning control that is automatically executed independently of the steering operation performed by the driver.

1-3-1. Example of Driver-Driven Turning Control

The driver-driven turning control includes "assist control" for reducing the driver's steering load when performing the steering operation. In the assist control, the control device 100 controls the turning device 20 to assist turning of the wheel 2.

More specifically, the control device 100 calculates an assist torque based on the steering torque MT and the vehicle speed V. Typically, the assist torque becomes larger as the steering torque MT becomes larger. Then, the control device 100 controls the turning device 20 such that the assist torque is generated. The assist torque assists the turning of the wheel 2, thereby reducing the driver's steering load.

The assist control may include damping control and compensation control. The damping control is for generating a damping force that acts in a direction to suppress a steering speed. The damping force becomes larger as the steering speed (dMA/dt) becomes higher. Due to the damping control, the steering speed is suppressed and convergence is improved. The compensation control is for improving steering feeling of the driver.

1-3-2. Example of Automated Turning Control

In the automated turning control, the control device 100 controls the turning device 20 to automatically turn (i.e. change a direction of) the wheel 2 independently of the steering operation performed by the driver. For example, the automated turning control includes the trajectory-following control that controls travel of the vehicle 1 such that the vehicle 1 follows the target trajectory TR.

Figure 7:
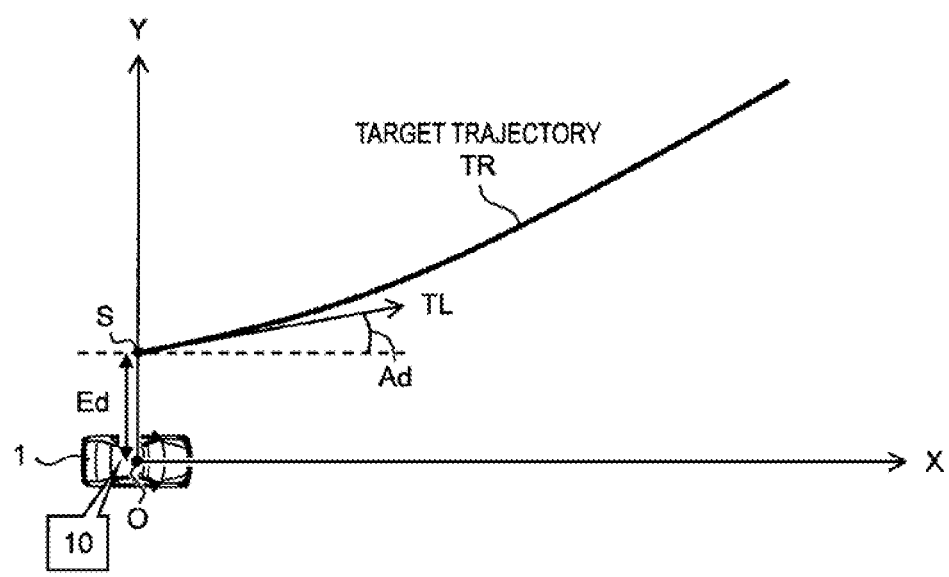
FIG. 7 is a conceptual diagram for explaining trajectory-following control as an example of the automated turning control according to the first embodiment of the present disclosure.

FIG. 7 is a conceptual diagram for explaining the trajectory-following control. First, let us define a coordinate system (X, Y). In the example shown in FIG. 7, an origin O is located at a center of the vehicle 1. An X-direction is a forward direction of the vehicle 1, and a Y-direction is a planar direction orthogonal to the X-direction. However, the coordinate system (X, Y) is not limited to the example shown in FIG. 7.

The target trajectory TR is defined in the coordinate system (X, Y) at a certain timing. A point S is located on the target trajectory TR and in the Y-direction from the origin O. A lateral deviation Ed is a distance between the origin O and the point S, that is, a distance between the vehicle 1 and the target trajectory TR. A yaw angle deviation (an azimuth angle deviation) Ad is an angle between the X-direction and a tangent line TL to the target trajectory TR at the point S.

The control device 100 generates the target trajectory TR based on the driving environment information 70. For example, the target trajectory TR is set to a line passing through the center of the travel lane. The control device 100 can calculate the target trajectory TR based on the map information 71 and the position information 72. Alternatively, the control device 100 can calculate the target trajectory TR based on the surrounding situation information 73 (e.g. information on the white line). However, a method of calculating the target trajectory TR is not limited to that.

Subsequently, the control device 100 calculates a first deviation between the vehicle 1 and the target trajectory TR (e.g. the lateral deviation Ed and the yaw angle deviation Ad) based on the target trajectory TR and the driving environment information 70. For example, the control device 100 can calculate the first deviation based on the target trajectory TR and the position information 72. In addition, the control device 100 may calculate an amount of vehicle movement based on the vehicle state information 74 (e.g. the vehicle speed V and the yaw rate YR) to correct the first deviation based on the amount of vehicle movement.

Then, the control device 100 controls travel of the vehicle 1 such that the first deviation (the lateral deviation Ed and the yaw angle deviation Ad) decreases. More specifically, the control device 100 calculates a target yaw rate YRt required for decreasing the first deviation. For example, the target yaw rate YRt is expressed as the following Equation (1).

$$YRt = Ga \times Ed + Gb \times Ad \quad \text{Equation (1):}$$

The parameters Ga and Gb in Equation (1) are gains for the lateral deviation Ed and the yaw angle deviation Ad, respectively. Equation (1) may further include a feedforward term based on a curvature of the target trajectory TR.

The control device 100 calculates a target turn angle θt according to a yaw rate deviation being a difference between the target yaw rate YRt and the actual yaw rate YR. The actual yaw rate YR is obtained from the vehicle state information 74. The target turn angle θt becomes larger as the yaw rate deviation becomes larger.

Then, the control device 100 executes feedback control such that the actual turn angle θ follows the target turn angle θt. The actual turn angle θ is detected by the turn angle sensor 43. The feedback control is for example PID control. For example, the control device 100 executes the feedback control based on a second deviation between the target turn angle θt and the actual turn angle θ. In this manner, the trajectory-following control is realized.

1-3-3. Example of Functional Block

Figure 8:
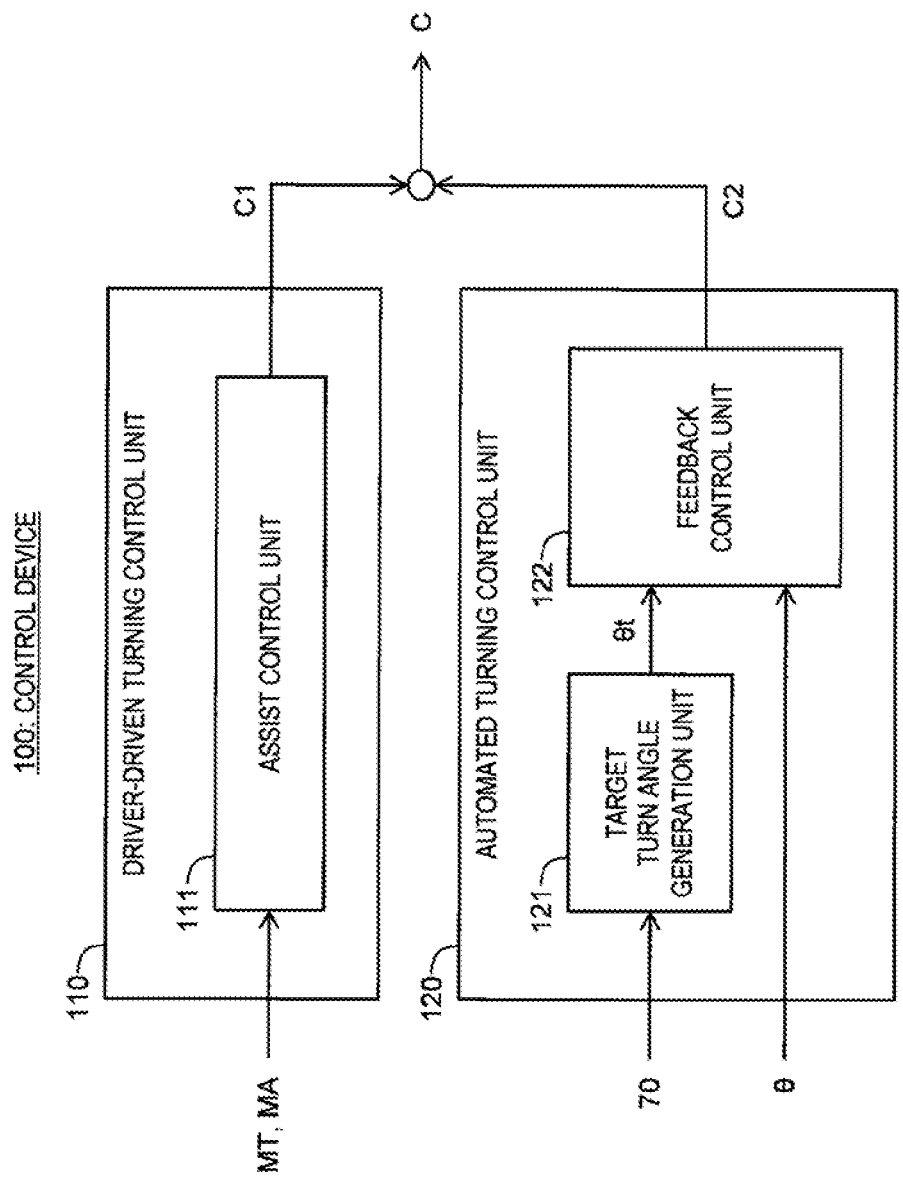
FIG. 8 is a block diagram showing a basic functional configuration of a control device according to the first embodiment of the present disclosure.

FIG. 8 is a block diagram showing a basic functional configuration of the control device 100 according to the present embodiment. The control device 100 includes a driver-driven turning control unit 110 and an automated turning control unit 120 as functional blocks related to the turning control. These functional blocks are achieved by the processor of the control device 100 executing the control program stored in the memory.

The driver-driven turning control unit 110 executes the driver-driven turning control. The driver-driven turning control unit 110 calculates a first control amount C1 required for the driver-driven turning control. The first control amount C1 is exemplified by a torque command, a current command and the like for driving the turning device 20 (turning motor).

For example, the driver-driven turning control unit 110 includes an assist control unit 111 that executes the above-described assist control. The assist control unit 111 calculates a basic assist control amount for generating the assist torque, based on the steering torque MT and the like. The basic assist control amount becomes larger as the steering torque MT becomes larger. In addition, the assist control unit 111 calculates a damping control amount for generating the damping force, based on the steering speed (dMA/dt). The damping control amount becomes larger as the steering speed becomes higher. Furthermore, the assist control unit 111 calculates a compensation control amount for the compensation control. Then, the assist control unit 111 calculates a sum of the basic assist control amount, the damping control amount, and the compensation control amount, as the first control amount C1 required for the assist control.

The automated turning control unit 120 executes the automated turning control. The automated turning control unit 120 calculates a second control amount C2 required for the automated turning control. The second control amount C2 is exemplified by a torque command, a current command and the like for driving the turning device 20 (turning motor).

For example, the automated turning control unit 120 executes the trajectory-following control described above. In that case, the automated turning control unit 120 includes a target turn angle generation unit 121 and a feedback control unit 122.

The target turn angle generation unit 121 calculates the target turn angle θt based on the driving environment information 70. More specifically, based on the driving environment information 70, the target turn angle generation unit 121 generates the target trajectory TR and calculates the first deviation between the vehicle 1 and the target trajectory TR (i.e. the lateral deviation Ed and the yaw angle deviation Ad). The target turn angle generation unit 121 calculates the target yaw rate YRt in accordance with the above-described Equation (1). Then, the target turn angle generation unit 121 calculates the target turn angle θt according to the yaw rate deviation being the difference between the target yaw rate YRt and the actual yaw rate YR.

The feedback control unit 122 executes the feedback control such that the actual turn angle θ follows the target turn angle θt. More specifically, the feedback control unit 122 calculates the second control amount C2 required for the actual turn angle θ to follow the target turn angle θt. For example, the feedback control unit 122 calculates the second control amount C2 according to the second deviation between the target turn angle θt and the actual turn angle θ. The second control amount C2 becomes larger as the second deviation becomes larger.

The control device 100 integrates the first control amount C1 with the second control amount C2 to generate a turning control amount C. The control device 100 controls the turning device 20 in accordance with the turning control amount C to achieve the necessary turning control.

1-4. System Suppression Processing

Figure 9:
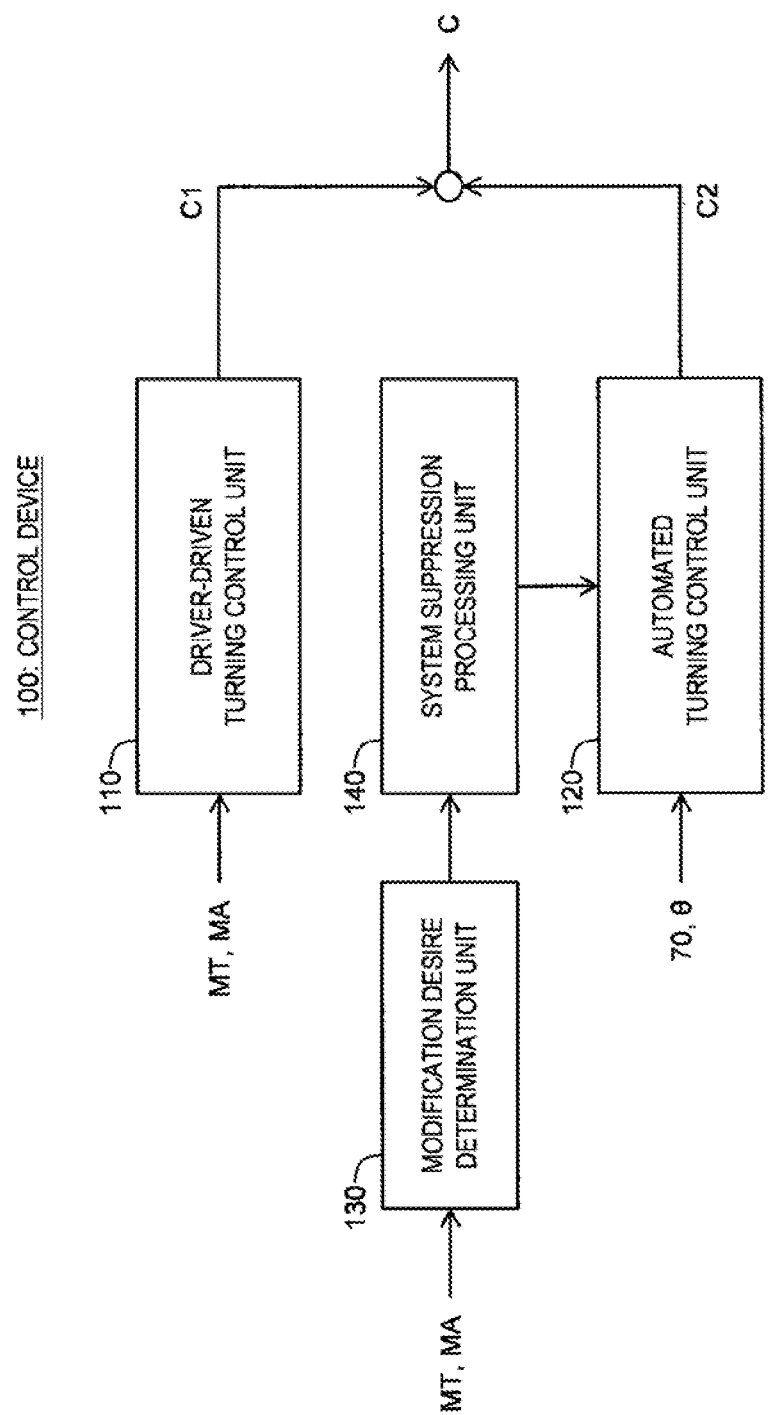
FIG. 9 is a block diagram showing a functional configuration related to the system suppression processing executed by the control device according to the first embodiment of the present disclosure.

FIG. 9 is a block diagram showing a functional configuration related to the system suppression processing executed by the control device 100. The control device 100 further includes a modification desire determination unit 130 and a system suppression processing unit 140 in addition to the driver-driven turning control unit 110 and the automated turning control unit 120 described above. These functional blocks are achieved by the processor of the control device 100 executing the control program stored in the memory.

Figure 10:
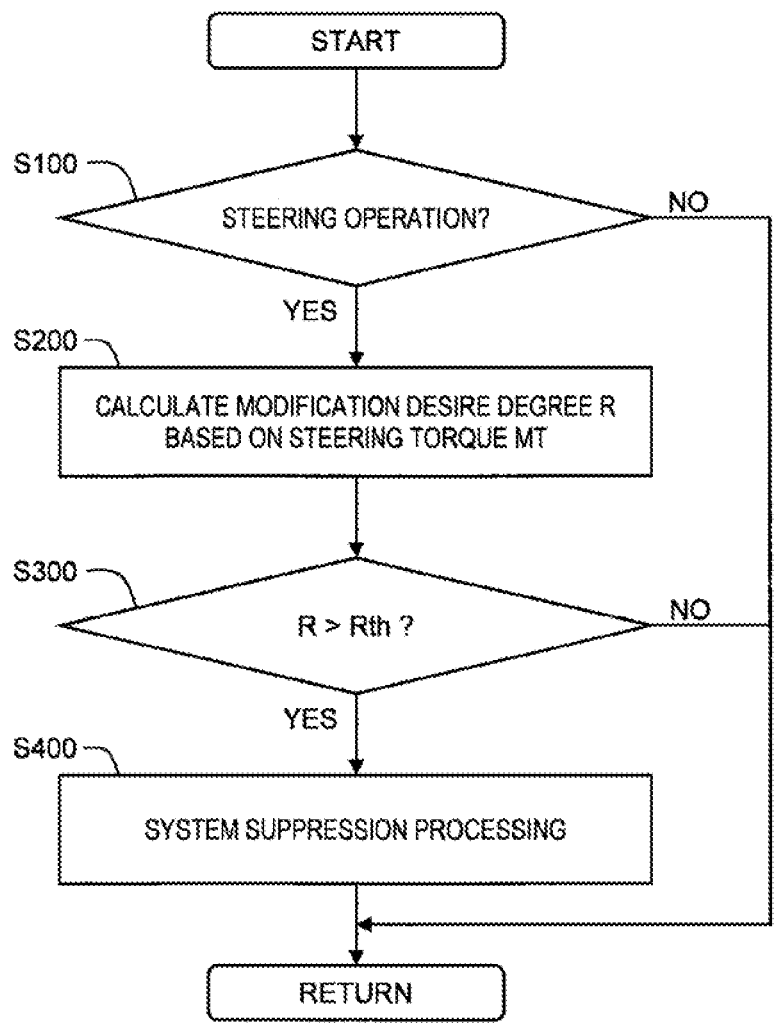
FIG. 10 is a flow chart showing processing related to the system suppression processing executed by the control device according to the first embodiment of the present disclosure.

FIG. 10 is a flow chart showing processing related to the system suppression processing executed by the control device 100. The processing related to the system suppression processing will be described with reference to FIGS. 9 and 10.

1-4-1. Step S100

During execution of the automated turning control, the modification desire determination unit 130 determines whether or not the steering operation is performed by the driver. For example, the modification desire determination unit 130 determines, based on the steering wheel angle MA, whether or not the steering operation is performed. When the steering operation is performed (Step S100; Yes), the processing proceeds to Step S200. Otherwise (Step S100; No), the processing in the current cycle ends.

As a modification example, the modification desire determination unit 130 may determine whether the steering operation is a normal one or one for emergency avoidance. For example, when the steering wheel angle MA and the steering speed (dMA/dt) are respectively equal to or less than predetermined thresholds, the modification desire determination unit 130 determines that a normal steering operation is performed. When the normal steering operation is performed (Step S100; Yes), the processing proceeds to Step S200. Otherwise (Step S100; No), the processing in the current cycle ends.

1-4-2. Step S200

During execution of the automated turning control, the modification desire determination unit 130 calculates the modification desire degree R. The modification desire degree R represents a degree to which the steering operation performed by the driver modifies the vehicle travel caused by the automated turning control. When the the steering operation performed by the driver modifies the vehicle travel caused by the automated turning control, the steering torque MT increases. Therefore, the modification desire determination unit 130 calculates the modification desire degree R based on the steering torque MT detected by the steering torque sensor 42.

Figure 11:
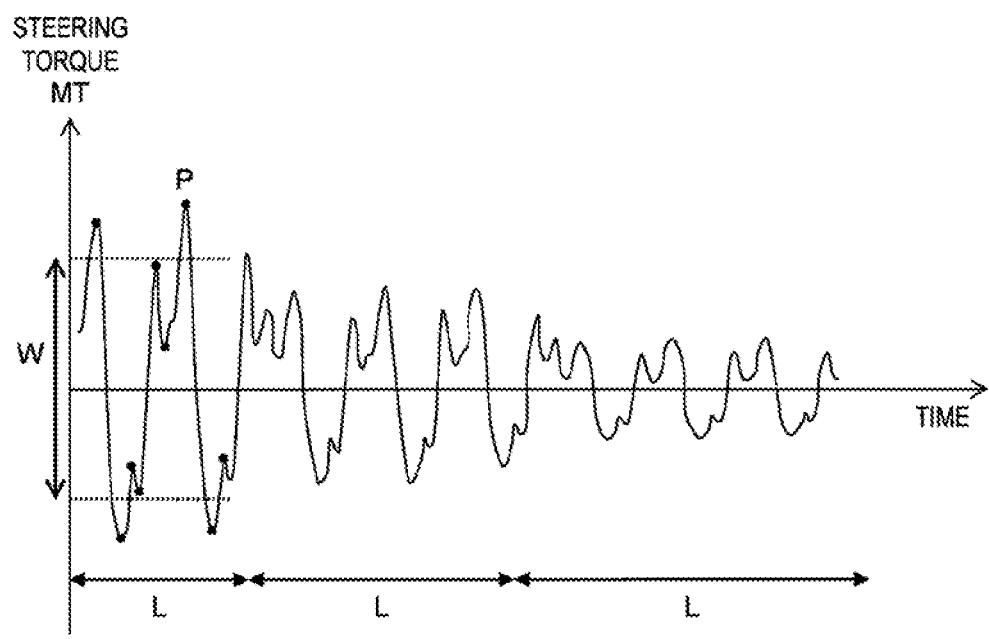
FIG. 11 is a timing chart for explaining examples of a method of calculating a modification desire degree in the first embodiment of the present disclosure.

FIG. 11 is a timing chart for explaining examples of a method of calculating the modification desire degree R. A vertical axis represents the steering torque MT, and a horizontal axis represents time. As a result of the steering operation performed by the driver and modifying the vehicle travel, the steering torque MT fluctuates. The modification desire determination unit 130 calculates a fluctuation range W of the steering torque MT. For example, the modification desire determination unit 130 samples and memorizes peak values P (extrema) of the steering torque MT. Further, the modification desire determination unit 130 calculates an average value of the peak values P sampled within a certain period of time for each of positive and negative. Then, the modification desire determination unit 130 calculates the fluctuation range W from the positive and negative average values of the peak values P.

In a first example, the fluctuation range W of the steering torque MT is used as the modification desire degree R. That is, the modification desire determination unit 130 calculates the fluctuation range W of the steering torque MT as the modification desire degree R.

In a second example, the modification desire degree R is duration or an occurrence frequency (i.e. the number of occurrences within a certain period of time) of a state where the fluctuation range W of the steering torque MT exceeds a fluctuation range threshold Wth. If the modification by the driver occurs for a long time or frequently, it is presumed that the driver is feeling annoyance strongly. Using the modification desire degree R of the second example makes it possible to detect such the driver's strong sense of annoyance.

In a third example, the modification desire degree R is an integral value of the fluctuation range W of the steering torque MT in an integration period L (a first period). Also in the third example, it is possible to take the duration or the occurrence frequency of the modification by the driver into consideration, as in the case of the above-described second example. That is, it is possible to detect the driver's strong sense of annoyance.

In the above-described third example, the modification desire determination unit 130 may variably set the integration period L. For example, the modification desire determination unit 130 variably sets the integration period L according to the fluctuation range W of the steering torque MT. The integration period L is longer as the fluctuation range W of the steering torque MT is smaller, and the integration period L is shorter as the fluctuation range W of the steering torque MT is larger (see FIG. 11). As a result, it is possible to appropriately detect the driver's intention to modify even when the fluctuation range W of the steering torque MT is small. Moreover, when the fluctuation range W of the steering torque MT is large, the integration period L becomes short, which enables early transition to the next Step S300. This contributes to greater efficiency of the processing.

1-4-3. Step S300

After calculating the modification desire degree R, the modification desire determination unit 130 compares the modification desire degree R with the threshold Rth. When the modification desire degree R exceeds the threshold Rth (Step S300; Yes), it is determined that the driver the driver is feeling senses of strangeness and annoyance with respect to the vehicle travel caused by the automated turning control. In that case, the processing proceeds to Step S400. On the other hand, when the modification desire degree R is equal to or lower than the threshold Rth (Step S300; No), the processing in the current cycle ends.

1-4-4. Step S400

The system suppression processing unit 140 executes the system suppression processing. That is, the system suppression processing unit 140 weakens the automated turning control executed by the automated turning control unit 120 as compared to the case where the modification desire degree R is equal to or lower than the threshold Rth. Here, "weakening the automated turning control" means decreasing influence (contribution) of the automated turning control on the turning of the wheel 2.

For example, the system suppression processing unit 140 decreases a control gain used for calculating the second control amount C2 in the automated turning control unit 120. Since the control gain used for calculating the second control amount C2 of the automated turning control is decreased, the automated turning control weakens.

As an example, a case where the automated turning control is the trajectory-following control is considered. As described above, the automated turning control unit 120 (the target turn angle generation unit 121) calculates the first deviation between the vehicle 1 and the target trajectory TR (i.e. the lateral deviation Ed and the yaw angle deviation Ad). Then, the automated turning control unit 120 calculates the target turn angle θt based on the first deviation and the above-described Equation (1). The above-described Equation (1) includes a first gain (i.e. gains Ga, Gb) used for calculating the target turn angle θt from the first deviation. The system suppression processing unit 140 decreases the first gain.

Moreover, the automated turning control unit 120 (the feedback control unit 122) executes the feedback control such that the actual turn angle θ follows the target turn angle θt. The system suppression processing unit 140 may decrease a gain (a second gain) of the feedback control. For example, when the feedback control is PID control, the system suppression processing unit 140 decreases a proportional gain. The system suppression processing unit 140 may decrease a derivative gain or an integral gain.

The system suppression processing unit 140 decreases at least one of the first gain and the second gain in the automated turning control unit 120. As a result, the trajectory-following control (i.e. the automated turning control) weakens.

As described above, when the modification desire degree R exceeds the threshold Rth, the automated turning control weakens. As a result, the driver's senses of strangeness and annoyance during execution of the automated turning control are reduced. A degree to which the automated turning control weakens may increase as the modification desire degree R increases from the threshold Rth. For example, an amount of decrease in the control gain of the automated turning control increases as the modification desire degree R increases from the threshold Rth. This makes it possible to further effectively reduce the driver's senses of strangeness and annoyance.

2. Second Embodiment

A second embodiment differs from the above-described first embodiment in the system suppression processing (Step S400). An overlapping description with the first embodiment will be omitted as appropriate.

Figure 12:
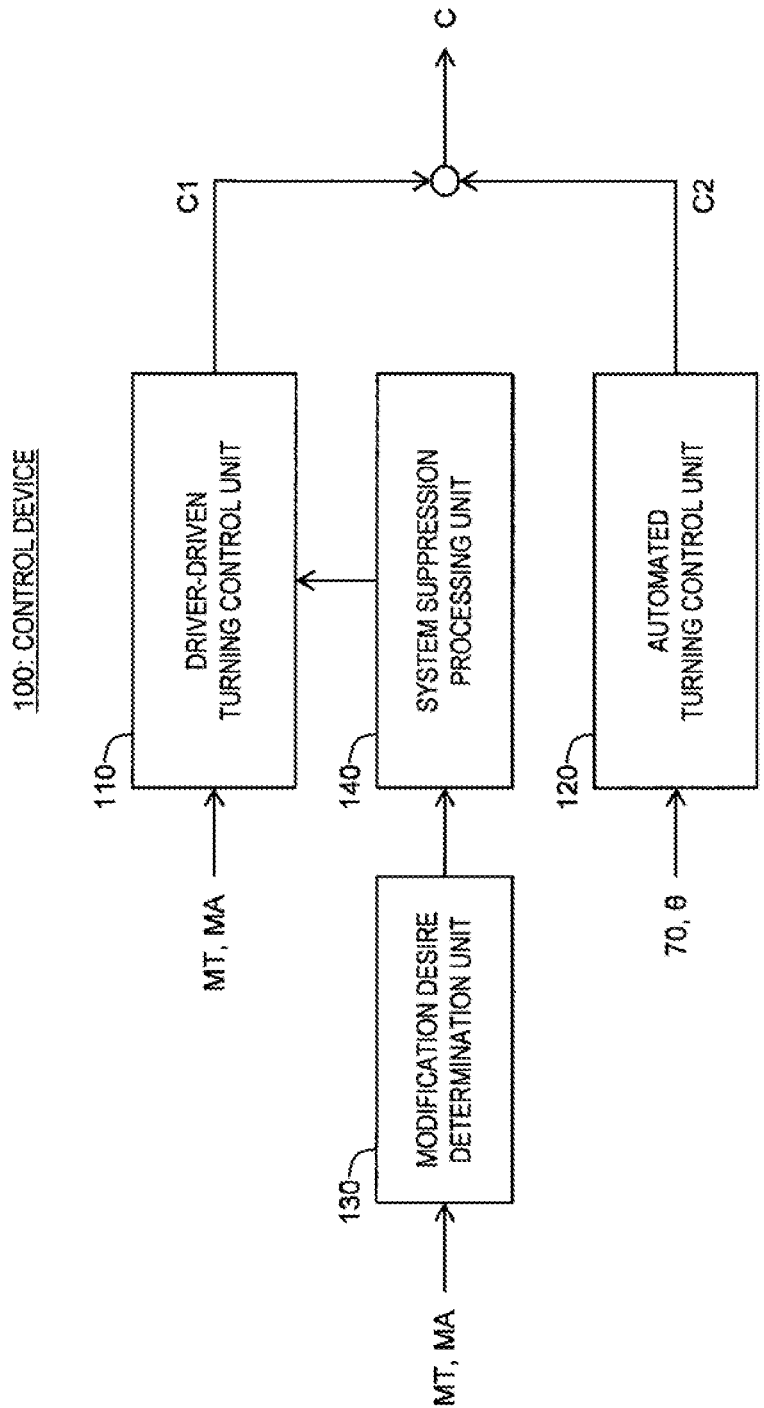
FIG. 12 is a block diagram showing a functional configuration related to the system suppression processing executed by the control device according to a second embodiment of the present disclosure.

FIG. 12 is a block diagram showing a functional configuration related to the system suppression processing according to the second embodiment. The system suppression processing unit 140 strengthens the driver-driven turning control executed by the driver-driven turning control unit 110 instead of weakening the automated turning control executed by the automated turning control unit 120.

In particular, the system suppression processing unit 140 strengthens the assist control executed by the assist control unit 111 (see FIG. 8). Here, "strengthening the assist control" means increasing influence (contribution) of the assist control on the turning of the wheel 2. As described above, the assist control unit 111 calculates the basic assist control amount for generating the assist torque based on the steering torque MT and the like. The system suppression processing unit 140 increases a control gain used for calculating the basic assist control amount from the steering torque MT and the like. As a result, the assist control is strengthened. Since the assist control (i.e. the assist torque) is strengthened, the automated turning control is relatively weakened.

It should be noted that increase in the assist torque may cause, for example, hunting when returning the steering wheel. In order to suppress such the hunting, it is preferable that the system suppression processing unit 140 concurrently strengthens the damping control as well. The damping control is for generating the damping force that acts in a direction to suppress the steering speed. Since the damping force increases, the hunting is suppressed and convergence is improved.

3. Third Embodiment

In a third embodiment, a vehicle 1 of a steer-by-wire type is considered. An overlapping description with the first embodiment will be omitted as appropriate.

Figure 13:
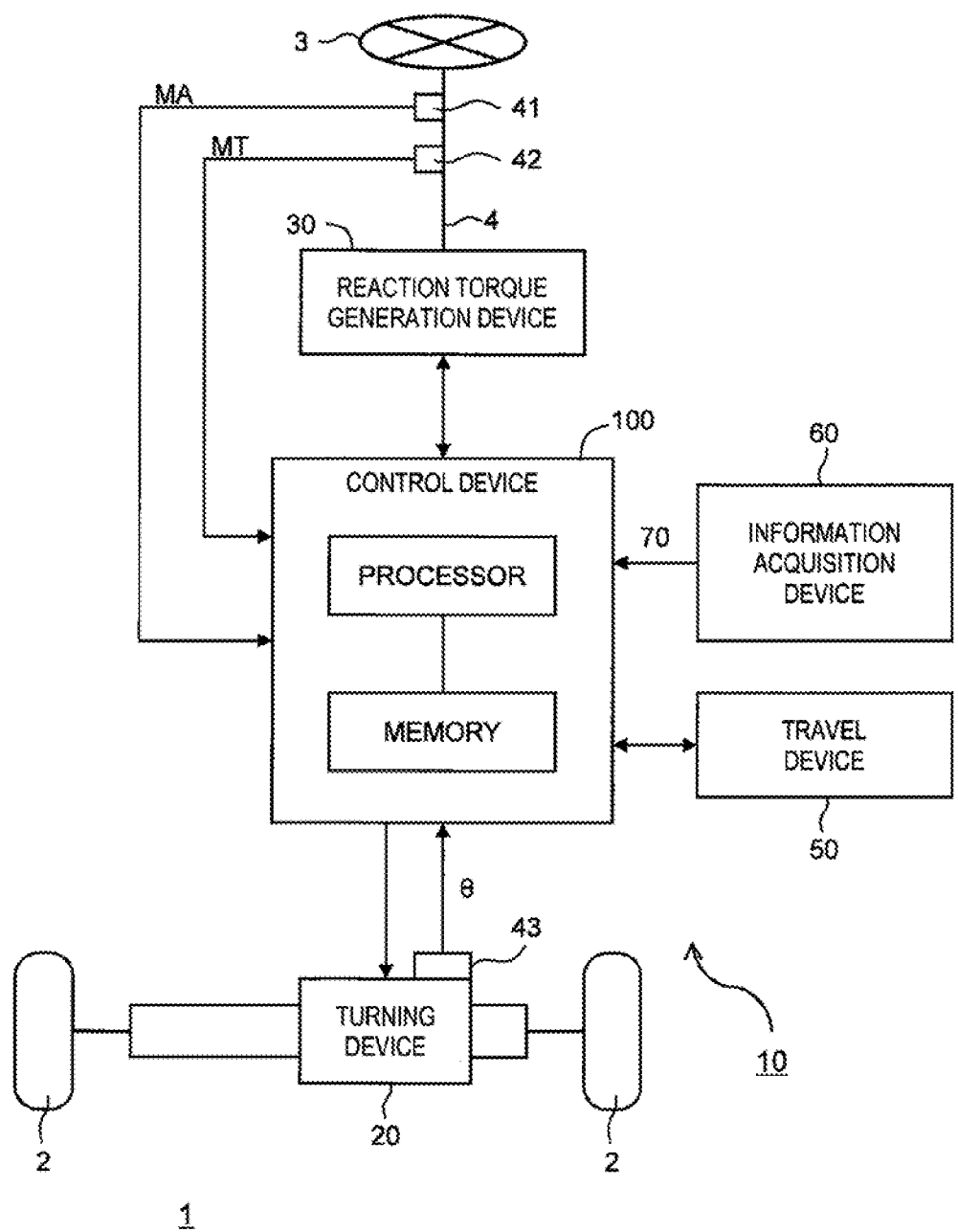
FIG. 13 is a block diagram showing a concrete configuration example of the vehicle and the vehicle control system according to a third embodiment of the present disclosure.

FIG. 13 is a block diagram showing a configuration example of the vehicle 1 and the vehicle control system 10 according to the third embodiment. The wheel 2 and the steering wheel 3 (the steering shaft 4) can be mechanically separated from each other. The vehicle control system 10 further includes a reaction torque generation device 30 in addition to the configuration described in the first embodiment (see FIG. 5).

The reaction torque generation device 30 applies a reaction torque to the steering wheel 3 in a pseudo manner. More specifically, the reaction torque generation device 30 includes a reaction motor (a reaction actuator). A rotor of the reaction motor is connected to the steering shaft 4 through a speed reducer. Actuating the reaction motor makes it possible to apply the reaction torque to the steering shaft 4 and thus to the steering wheel 3.

The control device 100 controls the turning of the wheel 2 by controlling the turning device 20 according to the steering operation performed by the driver. For example, the control device 100 calculates a target turn angle based on the steering wheel angle MA, the vehicle speed V, and so forth. Then, the control device 100 controls the turning device 20 (the turning motor) such that the turn angle θ of the wheel 2 becomes the target turn angle.

Moreover, the control device 100 controls the reaction torque applied to the steering wheel 3 by controlling the reaction torque generation device 30 according to the steering operation performed by the driver. For example, the control device 100 calculates a target reaction torque based on the steering wheel angle MA, the vehicle speed V, and so forth. Then, based on the target reaction torque and the steering torque MT, the control device 100 controls the reaction torque generation device 30 (the reaction motor) such that the target reaction torque is applied to the steering wheel 3.

It should be noted that the control device 100 may separately include a first control device for controlling the turning device 20 and a second control device for controlling the reaction torque generation device 30. In that case, the first control device and the second control device are communicably connected to each other and exchange necessary information with each other.

Figure 14:
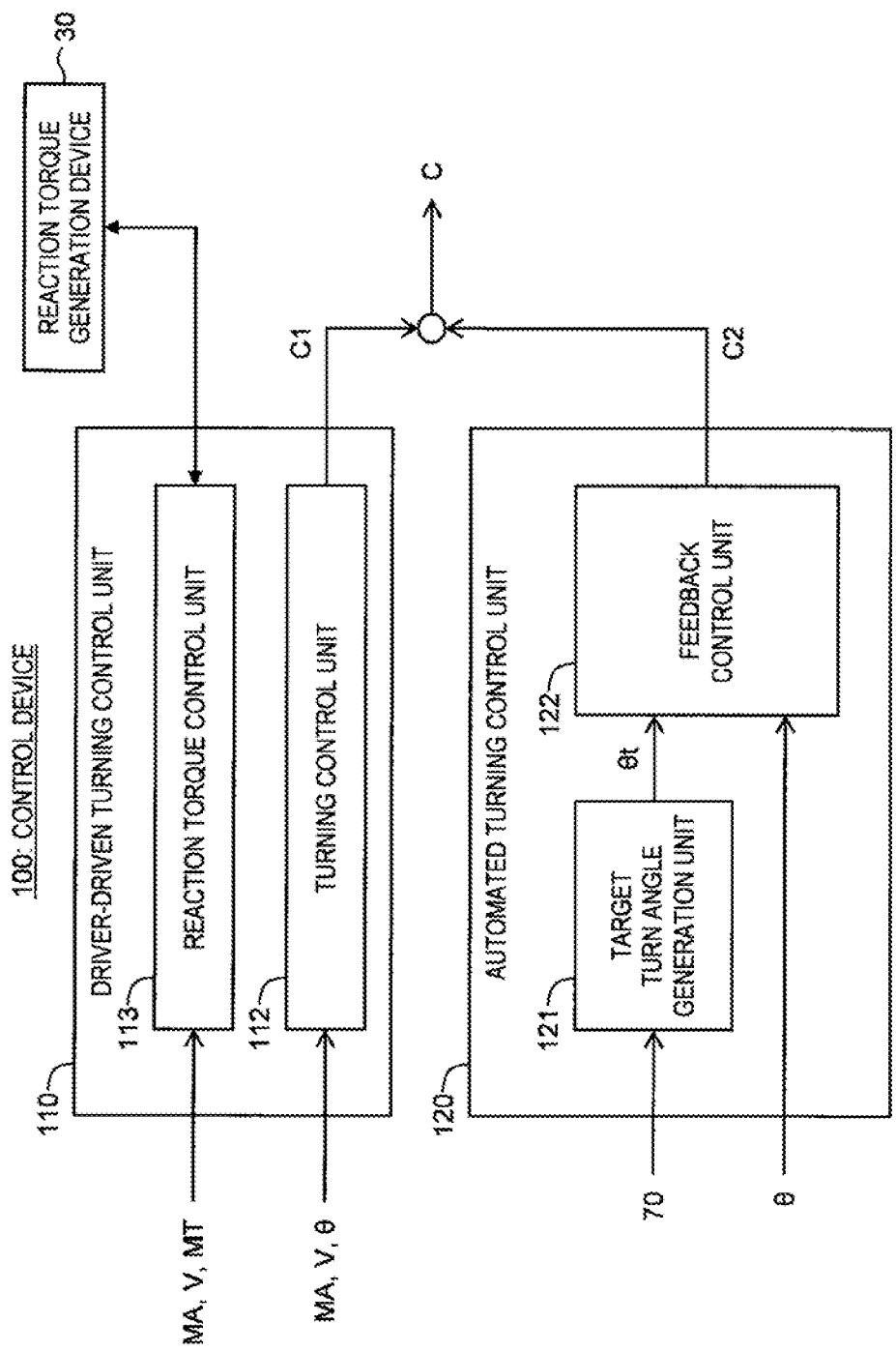
FIG. 14 is a block diagram showing a basic functional configuration of the control device according to the third embodiment of the present disclosure.

FIG. 14 is a block diagram showing a basic functional configuration of the control device 100 according to the third embodiment. The automated turning control unit 120 is the same as that in the case of the first embodiment (see FIG. 8). The driver-driven turning control unit 110 includes a turning control unit 112 and a reaction torque control unit 113.

The turning control unit 112 calculates the target turn angle based on the steering wheel angle MA, the vehicle speed V, and so forth. Then, the turning control unit 112 generates the first control amount C1 for driving the turning device 20 (the turning motor), based on a deviation between the actual turn angle θ and the target turn angle.

The reaction torque control unit 113 calculates the target reaction torque based on the steering wheel angle MA, the vehicle speed V, and so forth. Then, the reaction torque control unit 113 generates a control signal for driving the reaction torque generation device 30 (the reaction motor), based on the target reaction torque, the steering torque MT, and the like. The reaction motor is driven in accordance with the control signal, and thus the reaction torque is generated.

The system suppression processing is the same as in the case of the first embodiment (see FIGS. 9 and 10). That is, when the modification desire degree R exceeds the threshold Rth, the system suppression processing unit 140 executes the system suppression processing to weaken the automated turning control. As a result, the same effects as in the case of the first embodiment can be obtained.

What is claimed is:

1. A vehicle control system that controls a vehicle, comprising:
    a steering sensor configured to detect a steering operation performed by a driver of the vehicle; and
    a control device configured to execute automated turning control that automatically turns a wheel of the vehicle, independently of the steering operation, wherein
    a modification desire degree represents a degree to which the steering operation performed by the driver modifies vehicle travel caused by the automated turning control,
    during execution of the automated turning control, the control device calculates the modification desire degree based on a result of detection by the steering sensor,
    when the modification desire degree exceeds a threshold, the control device executes system suppression processing without terminating the automated turning control,
    in the system suppression processing, the control device weakens the automated turning control as compared to a case where the modification desire degree is equal to or lower than the threshold,
    the automated turning control includes trajectory-following control that controls turning of the wheel such that the vehicle follows a target trajectory,
    in the trajectory-following control, the control device calculates a target turn angle based on a deviation between the vehicle and the target trajectory and executes feedback control such that an actual turn angle follows the target turn angle, and
    in the system suppression processing, the control device decreases a gain used for calculating the target turn angle from the deviation as compared to the case where the modification desire degree is equal to or lower than the threshold.

2. The vehicle control system according to claim 1, wherein
    a degree to which the automated turning control weakens increases as the modification desire degree increases from the threshold.

3. The vehicle control system according to claim 1, wherein
    the steering sensor detects a steering torque caused by the steering operation, and
    the control device calculates the modification desire degree based on a fluctuation range of the steering torque.

4. The vehicle control system according to claim 3, wherein
    the modification desire degree is the fluctuation range of the steering torque.

5. The vehicle control system according to claim 3, wherein
    the modification desire degree is duration or an occurrence frequency of a state where the fluctuation range of the steering torque exceeds a fluctuation range threshold.

6. The vehicle control system according to claim 3, wherein
    the modification desire degree is an integral value of the fluctuation range of the steering torque in a first period.

7. The vehicle control system according to claim 6, wherein
    the control device variably sets the first period according to the fluctuation range of the steering torque, and
    the first period is shorter as the fluctuation range of the steering torque is larger.

8. A vehicle control system that controls a vehicle, comprising:
    a steering sensor configured to detect a steering operation performed by a driver of the vehicle; and
    a control device configured to:
        execute assist control that assists turning of a wheel of the vehicle according to the steering operation performed by the driver; and
        execute automated turning control that automatically turns the wheel, independently of the steering operation, wherein
    a modification desire degree represents a degree to which the steering operation performed by the driver modifies vehicle travel caused by the automated turning control,
    during execution of the automated turning control, the control device calculates the modification desire degree based on a result of detection by the steering sensor,
    when the modification desire degree exceeds a threshold, the control device executes system suppression processing without terminating the automated turning control, and
    in the system suppression processing, the control device weakens the automated turning control or strengthens the assist control as compared to a case where the modification desire degree is equal to or lower than the threshold,
    wherein the automated turning control includes trajectory-following control that controls turning of the wheel such that the vehicle follows a target trajectory,
    in the trajectory-following control, the control device calculates a target turn angle based on a deviation between the vehicle and the target trajectory and executes feedback control such that an actual turn angle follows the target turn angle, and
    in the system suppression processing, the control device decreases a gain used for calculating the target turn angle from the deviation as compared to the case where the modification desire degree is equal to or lower than the threshold.

* * * * *